United States Patent [19]

Hayashi et al.

[11] Patent Number: 5,360,772
[45] Date of Patent: Nov. 1, 1994

[54] CERAMIC MATERIAL REINFORCED BY THE INCORPORATION OF TIC, TICN AND TIN WHISKERS AND PROCESSES FOR PRODUCTION THEREOF

[75] Inventors: Katsura Hayashi; Katsushi Sakaue, both of Kokubu, Japan

[73] Assignee: Kyocera Corporation, Kyoto, Japan

[21] Appl. No.: 735,371

[22] Filed: Jul. 24, 1991

[30] Foreign Application Priority Data

| Jul. 25, 1990 | [JP] | Japan | 2-196909 |
| Jul. 25, 1990 | [JP] | Japan | 2-196910 |
| Aug. 27, 1990 | [JP] | Japan | 2-226080 |
| Aug. 27, 1990 | [JP] | Japan | 2-226081 |
| May 28, 1991 | [JP] | Japan | 3-123862 |

[51] Int. Cl.$^5$ .................................. C04B 35/36
[52] U.S. Cl. ............................. 501/95; 501/127; 501/153
[58] Field of Search .............. 501/90, 92, 95, 96, 501/127, 98, 99; 528/28, 30

[56] References Cited

U.S. PATENT DOCUMENTS

| 3,580,708 | 5/1971 | Ogawa et al. | 51/307 |
| 4,647,405 | 3/1987 | Debely | 252/518 |
| 4,804,645 | 2/1989 | Ekstrom | 501/105 |
| 4,990,295 | 2/1991 | Hida | 264/65 |
| 5,017,316 | 5/1991 | Sowman | 264/60 |
| 5,059,564 | 10/1991 | Mehrotra et al. | 501/89 |
| 5,077,246 | 12/1991 | Weaver | 501/98 |

FOREIGN PATENT DOCUMENTS

| 0208910 | 1/1987 | European Pat. Off. . |
| 0283454 | 9/1988 | European Pat. Off. . |
| 0284584 | 9/1988 | European Pat. Off. . |
| 0335602 | 10/1989 | European Pat. Off. . |
| 0429420 | 5/1991 | European Pat. Off. . |
| 2211184 | 6/1989 | United Kingdom . |
| 8809243 | 12/1988 | WIPO . |
| 9005121 | 5/1990 | WIPO . |

*Primary Examiner*—Mark L. Bell
*Assistant Examiner*—A. Wright
*Attorney, Agent, or Firm*—Spensley Horn Jubas & Lubitz

[57] ABSTRACT

The whiskers-reinforced ceramics of the present invention is prepared from alumina powder activated by dry milling, with which Ti-based whiskers are mixed, by molding and sintering said mixture.

By the present invention the bending strength of the sintered body can be increased without impairing the effect of improving the fracture toughness which is imparted by the incorporation of Ti-based whiskers, since the particle size of alumina crystal in the sintered body can be controlled to 3 microns or less.

30 Claims, No Drawings

CERAMIC MATERIAL REINFORCED BY THE INCORPORATION OF TIC, TICN AND TIN WHISKERS AND PROCESSES FOR PRODUCTION THEREOF

BACKGROUND OF THE INVENTION

1. Field of the Invention

The present invention relates to whiskers-containing fiber-reinforced ceramics and, more particularly, relates to such ceramics with high fracture toughness that is particularly suitable for use as cutting tools and other abrasion resistant parts, and the process of production thereof.

2. Description of the Prior Art

While sintered bodies produced from alumina ($Al_2O_3$) are utilized as materials excelling in abrasion resistance for various industrial machine parts, its applicable field has been kept from expanding because of its shortcoming of inferior fracture toughness.

In view of the aforementioned circumstance, there have been various proposals aimed at improved fracture toughness.

As one example of the aforementioned proposals, there has been proposed in Japanese Laid-Open Application Sho 61-286271 and Japanese Laid-Open Application Sho 62-41776 certain means of improving fracture toughness by blending a fibrous material represented by silicon carbide whiskers.

Such a ceramic material reinforced by the incorporation of fibers containing SiC whiskers exhibits excellent performance properties in cutting certain ultra-heat resistant alloys (e.g. roughing cut on Inconel 718) when it is used as a cutting tool, since SiC by itself has high hardness and good heat conductivity.

Nevertheless, since SiC tends to readily react with iron, particularly iron oxides, $Al_2O_3$—SiC whiskers-based tools in many cases tend to wear off at a higher rate than tools consisting principally of $Al_2O_3$. For example, when a material constructed of SUS 304 is worked on for cutting, the tool containing SiC whiskers gives rise to a problem that cutting is practically impossible to perform due to the rapid progress of wear even under comparable conditions which would sufficiently enable the conventional $Al_2O_3$ tool to accomplish cutting. Besides, it has been verified that the wear rate of $Al_2O_3$—SiC whiskers-containing tool is higher than that of $Al_2O_3$ tool in cutting cast iron-made stock material.

As stated above, the $Al_2O_3$—Sic whiskers-containing tool poses a problem that cutting properties notably vary with the material to work on.

Meanwhile, there has been recently proposed the incorporation of titanium carbide (TIC) whiskers, which have a lower reactivity with iron than SiC, instead of SiC whiskers, for the purpose of eliminating such reactivity with the ferrous material worked on.

Nevertheless, in the case of $Al_2O_3$—TiC material, its strength tends to decrease, since the particle size of alumina increases due to the grain growth of alumina in the sintering step which is excessively high. As for the cause of excessively high grain growth of $Al_2O_3$ in the sintering step, it is inferred firstly that the difficulty with the preparation of fine, uniform TiC whiskers restrains the inherent effect of the whiskers to inhibit the grain growth of alumina only to a low level, and secondly that $TiO_2$ produced by oxidation of TiC whiskers on their surfaces accelerates the grain growth of $Al_2O_3$.

Ordinarily, mechanical properties of the alumina-based sintered body to a large extent depend upon the particle size of alumina crystal in the sintered body, and it is said that the smaller the particle size, the higher becomes its strength.

Hence, under the present circumstance, the conventional $Al_2O_3$—Tic whiskers-containing material properties are not upgraded to an extent that such material is rendered practically useful.

SUMMARY OF THE INVENTION

The inventors of the present invention have found, through intensive studies on the aforementioned problems liable to occur with TiC whiskers-reinforced ceramics containing fibrous substances like TiC whisker, that a sintered body can be obtained such that the grain growth of alumina is inhibited and properties such as strength are notably improved by means of incorporating whiskers in $Al_2O_3$ powder which has been activated by dry pulverization or the addition of carbon powder, silicon carbide, or a boron-containing compound or limitation of the oxygen content of whiskers and then sintering of the mixture.

Namely, the object of the present invention is to provide ceramic materials reinforced by the incorporation of alumina containing whiskers wherein the grain growth of alumina is inhibited and properties such as strength are improved, and a process for production thereof.

The present invention provides a ceramic material reinforced by the incorporation of alumina which is characterized in that at least one kind of whiskers selected from among titanium carbide whiskers, titanium nitride whiskers and titanium carbo-nitride whiskers is added to the matrix consisting principally of alumina, wherein the aforementioned whiskers are contained at a ratio of 5 to 70 volume % and the aforementioned alumina has an average particle size of 3 microns or less.

The present invention further provides a process for producing a ceramic material reinforced by the incorporation of alumina fibers which is characterized in that at least one kind of whiskers selected from among titanium carbide whiskers, titanium nitride whiskers and titanium carbo-nitride whiskers is added to alumina powder having an average particle size of 3 microns or less, which has been activated by dry pulverization, at a ratio of 5 to 70 volume %, and said components are mixed, and then this mixture is given a shape and sintered.

According to the present invention, activation of alumina powder is achieved by dry pulverization as energy is accumulated in the powder owing to particle-to-particle contact and impingement. If the sintered body is produce from such powder, the particle size of $Al_2O_3$ crystal in the finally obtained sintered body is small even in cases where any effect of inhibiting the grain growth alumina which could be expected from whiskers cannot be recognized, since the sintering temperature can be set at a relatively low level, thus allowing the process of sintering $Al_2O_3$ to proceed with the side effect of inhibiting the grain growth of alumina. As has been discussed above, since the particle size of $Al_2O_3$ crystal in the sintered body can be controlled to a very fine level by the present invention, the bending strength and fracture toughness of the sintered body can be increased without impairing the effect of improving fracture toughness which is achieved by the incorporation of whiskers.

DETAILED DESCRIPTION OF THE INVENTION

The TiC whiskers-reinforced ceramics of the present invention is basically composed of a matrix principally consisting of alumina ($Al_2O_3$) in which is dispersed titanium-based whiskers.

One of the essential characteristics of the present invention derives from the average particle size of alumina constituting the matrix which is controlled to less than 3 microns in the fibers-reinforced ceramics.

In conjunction with such inhibition of the grain growth of alumina as described above, the whiskers-ceramics ceramics of the present invention notably excels in mechanical properties.

Titanium-based whiskers are dispersed in the aforementioned matrix consisting principally of alumina, TiC whiskers, TiN whiskers and TiCN whiskers either singularly or in combination of two or more, if necessary. Such whiskers are dispersed at a ratio of 5–70 vol. %, preferably 5–60 vol. %, as against the total volume.

If the volume of the dispersed whiskers is less than 5 vol. %, the effect of improving the fracture toughness achieved by the incorporation thereof is little, while the sinterability of the whole system declines if the ratio exceeds 70 vol. %. In view of the acceptable mechanical properties and ease of sintering, the quantity of incorporated whiskers is preferably 25–45 vol. %, or most desirably 30–40 vol. %.

The aforementioned whiskers are in either single crystal form or polycrystal form, and preferably have a particle size of 10 microns or less, particularly 0.5–2.0 microns. The reason for this is that if the average particle size of whiskers exceeds 10 microns, breakage develops from thick whiskers to remarkably impair the strength of the sintered body thereby obtained. It also becomes difficult to achieve uniform (homogeneous) mixing of whiskers in the matrix in the manufacturing step, whereby variances are liable to occur in the strength and fracture toughness of the obtained product. Furthermore, the degree of phase abrasion on the flank increases when the sintered body thereby obtained is used as a cutting tool.

On the other hand, if the aspect ratio, which represents the length-to-diameter ratio of a unit whisker, is excessively small, a high fracture toughness is hardly ensured, since such a small aspect ratio reduces the effect of fiber reinforcement. By contrast, if the aspect ratio is excessively large, it is difficult to secure a high fracture toughness, since the handling of the raw material becomes difficult and such whiskers can not be dispersed evenly. For the aforementioned reason, whiskers having an average aspect ratio of 3–100, particularly 10–30, are preferably used.

Ti-based whiskers such as mentioned above are synthesized by carbonization, nitrogenization or the chemical vapor deposition (CVD) method.

The whiskers-reinforced ceramics consisting of either one of the aforementioned components under the present invention have a bending strength of 60 kg/mm² or more, particularly 70 kg/mm².

Furthermore, a third component such as a boron-containing metal compound, silicon carbide granules and carbon granules may be compounded with the whiskers-reinforced ceramics of the present invention.

For example, by compounding a boron-containing metal compound, whiskers-reinforced ceramics having high fracture toughness and hardness can be obtained. There can be mentioned as examples of such boron-containing metal compounds, borides of metals of Groups IVB, VB a or VIB a in the Periodic Table, such as $AlB_{12}$, $ZrB_2$, $TiB_2$, $TaB$, $WB$, $NbB_2$ and $LaB_6$ or borates containing Al such as $Al_{18}B_4O_{33}$ whiskers. Among the aforementioned compounds, boric acids such as $AlB_{12}$, $ZrB_2$, $TiB_2$, $WB$, $NbB_2$ and $Al_{18}B_4O_{33}$ are preferred in view of their sinterability and fracture toughness. Particularly, those consisting of rod-like crystal having an aspect ratio of 1.5 or more are preferred for Al-containing boric acids. It is desirable that those boron-containing metal compounds are compounded generally at a ratio of 0.02 to 40 weight %, particularly 0.5 to 10 weight %. If the quantity of the same is less than 0.02 weight %, the effect of improving the fracture toughness and hardness imparted is not sufficient, while if it is compounded in a quantity exceeding 40 weight %, the sinterability is deteriorated.

Besides, granular silicon carbide (SIC) is compounded with the intent to have it inhibit the reactivity with ferrous material and furthermore contribute to improvement of mechanical properties such as the fracture toughness. Particularly, it is used with TiC whiskers. For such granular, having an average particle size of 1 micron or less, particularly 0.5 micron or less, is preferred, while it is desirable that it is compounded at a ratio of 3 to 30 vol. %, particularly 5 to 15 vol. %.

If the quantity of SiC is less than 3 vol. %, the effect achievable from the incorporation of SiC particles, namely, the effect of inhibiting the grain growth of $Al_2O_3$, is lost; and if it exceeds 30 vol. %, the sinterability declines and furthermore the Ti-based whiskers react with SiC to produce a chemical compound, and thus it is no longer possible to obtain good sintered bodies. Moreover, the abrasion resistance of the sintered body prepared into a cutting tool notably declines.

Carbon, too, is used with TiC whiskers as is the case with granular SiC with the result of contributing to improvement of mechanical properties of the sintered body obtained therefrom. Such carbon may be either carbon powder having an average particle size of 1 micron or less, particularly 0.5 micron or less, carbon in such organic compound as phenolic resin capable of releasing carbon in the sintering step or carbon coated onto the surface of TiC whiskers beforehand.

Such carbon is used at a ratio of 0.05 to 2 weight % of the total quantity, particularly 0.5 to 1 weight %. If the amount of carbon added is less than 0.05 weight %, the effect of improving the fracture toughness is little, and as it exceeds 2 weight %, the sinterability and hardness and strength of the sintered body decline. Alumina powder is activated by the addition of said carbon powder, silicon carbide or a boron-containing compound, limitation of the oxygen content of whiskers and dry milling of alumina powder.

The preparation of fiber-reinforced ceramics

Preferably, alumina powder is used for the preparation of the aforementioned whiskers-reinforced ceramics of the present invention, having a purity of 99% or more, particularly 99.5% or more and having an average particle size of 3 microns or less. Above all, it is essential that alumina powder which has been activated is used. Such activation treatment is performed by means of dry milling. Specifically, any conventional method including rotary mill, vibrating mill, jet mill and attrition mill may be used, while a higher effect of activation is achieved by a highly efficient pulverization. Such pulverization treatment may be carried out on the alumina powder by itself or together with additives. The sinterability of alumina powder by itself can be increased by the aforementioned activation treatment.

While the Ti-based whiskers used in combination with the aforementioned alumina powder in the present invention contain oxygen as an impurity, it is desirable that Ti-based whiskers having an oxygen content of 3 weight % or less be used in the preparation of the fiber-reinforced ceramics of the present invention. Although the sinterability is improved with an increase in the oxygen content, the hardness and sinterability of the sintered body decreases, since the presence of the oxygen accelerates the grain growth of alumina. The desired level of oxygen content depends on the specific properties required of the sintered body. In cases where a high fracture toughness is desirable, the oxygen content is preferably 0 to 0.3 weight %. In case where a high hardness is desired, the oxygen content is preferably 0.2 to 2 weight %. In cases where ease of fabrication is desirable, the oxygen content is preferably 2 to 3 weight %. With view to ensuring an overall balance among the strength, hardness and fracture toughness, the preferred oxygen content is between 0.1 and 1.5 weight %. In cases where ceramics are prepared for cutting tool use, the oxygen content is preferably 0.05 to 0.2 weight %.

In the preparation of the whiskers-reinforced ceramics of the present invention, it is desirable that an oxide of at least one kind of element selected from among Mg, Ni, Co, Cr, Ca, Sr, Si and the elements of Group IIIB and lanthanides in the Periodic Table be used as an auxiliary sintering aid, since the addition of such agent enhances the sinterability of the matrix composition and improves properties of the ceramics thereby obtained.

The dosage of this auxiliary sintering aid varies with the kind of the third component used. For example, in cases where the aforementioned boron-containing metal compound is added, it is desirable that such auxiliary sintering aid is added by 0.02 to 8 weight %, particularly 0.5 to 5 weight %. In other cases, it is appropriate that it be added at a ratio of 0.5 to 2 weight %. If the amount of the auxiliary sintering aid is used in a quantity less than the aforementioned level, the effect of improving the sinterability achieved is not sufficient. In cases where it is used in a quantity exceeding the aforementioned level, the fracture toughness of the ceramics thereby obtained is low. As examples of the elements of Group IIIB an lanthanides in the Periodic Table, there can be mentioned Yb, Nd, Er, Ce, Sm, Y, Gd, Dy and La. If a boron-containing metal compound is used in the present invention, MgO, CaO, $SiO_2$ and oxides of elements of Group IIIB and lanthanides are suitably used among the aforementioned auxiliary sintering aids. Moreover, in cases where a boron-containing metal compound is not used, oxides of Mg, Co, Cr, Ni and rare earth elements are suitably used as an auxiliary sintering aid.

The whiskers-reinforced ceramics of the present invention are obtained after subjecting a mixture of the alumina powder and, if necessary, a third component, and an auxiliary sintering aid to a treatment for activation of alumina powder by means of the aforementioned dry milling by the process whereby Ti-based whiskers are admixed to said mixture, and the obtained mixture is molded into the desired shape by any selected molding process, such as compression molding, extrusion, injection molding and hydrostatic cold molding, whereupon the molded part is sintered.

Processes adopted for the sintering step include conventional sintering, the hot pressing method and the hot isostatic pressing method (HIP). The sintering is carried out at a temperature of 1650° to 1850° C. in an inert atmosphere of Ar or He, or in an reductive atmosphere in the presence of carbon, etc. under either a pressurized condition or under reduced pressure for 0.5 to 6 hours. Particularly, for the purpose of obtaining a high density sintered body, a sintered body having a density of 96% as compared to the theoretical density can be obtained by the conventional sintering or by the hot isostatic pressing method (HIP). The obtained sintered body is then subjected to a hydrostatic hot sintering step.

By adopting the aforementioned sintering step, the sintering step can be accomplished by a temperature level lower than in case of the conventional sintering by 50° to 100° C., owing to the improved sinterability of alumina itself which is achieved by the activation treatment of alumina powder. By the aforesaid sintering process, the average particle size of alumina crystal in the sintered body can be controlled to 3 microns or less, particularly, 1.5 microns or less. Accordingly, various properties of the ceramics, particularly, bending strength, can be largely improved. More specifically, the properties as evaluated in the 3-point bending strength test are improved to 60 kg/mm$^2$ or higher, particularly 70 kg/mm$^2$ as is obvious from the examples cited hereafter.

The particle size of whiskers in the sintered body remains at a level of 10 microns or less, since it undergoes hardly any change from that of its raw material.

The following Examples illustrate the present invention specifically.

EXAMPLE 1

After weighing out $Al_2O_3$ powder having an average particle size of 1 micron or less and a purity of 99.9% or higher and, if necessary, the auxiliary sintering aid in the powder form as set forth in Table 1, the powder was subjected to dry milling for 12 hours by either the ball mill, vibrating mill, attrition mill or jet mill methods. A specified quantity of TiC whiskers with an average particle size (the transverse diameter) of 1 micron, an aspect ratio of 10–30 and an oxygen content of 0.3 weight % was added to the mixed powder. The obtained powder was enclosed in a sealed nylon pot together with nylon balls and was mixed by the ball mill for 12 hours. The slurry obtained after the mixing step was dried and used as the slip to be processed by hot pressing.

The aforesaid slip was filled in a carbon mold and was sintered by hot pressing at a specified temperature for 1 hour under a pressure of 300 kg/cm$^2$ so that test specimens may be fabricated for the breaking strength test conforming to the JIS Standard. (Test Specimen Nos. 1 to 15.) Whiskers, however, were not added to Test Specimen No. 9.

Each test specimen was polished and tested for the 3-point bending strength and Vickers hardness; and the fracture toughness ($K_{10}$) was measured by the IM method with test specimens polished to a mirror finish.

The average crystal particle size of alumina was measured by observation of microscopic photographs.

Test results are set forth in Table 1.

More test specimens were prepared in the same manner as mentioned above except that instead of TiC whiskers, TiN whiskers and TiCN whiskers having an oxygen content of 0.3 weight %, an average particle size (the transverse diameter) of 1.5 microns and an aspect ratio of 20, respectively, and their properties were measured in the same manner as adopted for the test specimens prepared with TiC whiskers.

Test results of said tests are also set forth in Table 1 as specimens No. 16 and 17.

decreased notably while other properties could not be measured.

By measuring properties in the same manner as mentioned above of test specimens fabricated in the same manner as used for Test Specimen No. 1 except that TiC whiskers whose oxygen content exceeds 3 weight % was used, it was determined that the test specimens thus fabricated were inferior to those used in Test Specimen No. 1 with respect to the bending strength and fracture toughness.

TABLE 1

| Test Specimen No. 1) | Composition | | | Means of Pulverizing Alumina | Sintering Temperature (°C.) | Properties of Sintered Body | | | Average Crystal Diameter of Alumina (μm) |
|---|---|---|---|---|---|---|---|---|---|
| | Ti-based (Vol. %) | Auxiliary Sintering Agent (Wt. %) | $Al_2O_3$ | | | Bending Strength (Kg/mm$^2$) | Fracture Toughness (MPa · m$^{\frac{1}{2}}$) | Vickers Hardness (Kg/mm$^2$) | |
| *1 | TiC(W) 30 | $Y_2O_3$ 2 | balance | wet pulverization | 1850 | 35 | 5.0 | 1600 | 5.0 |
| 2 | TiC(W) 30 | $Y_2O_3$ 2 | balance | rotary mill | 1750 | 80 | 6.0 | 1900 | 3.0 |
| 3 | TiC(W) 30 | $Y_2O_3$ 2 | balance | vibrating mill | 1700 | 95 | 6.5 | 2000 | 1.5 |
| 4 | TiC(W) 30 | $Y_2O_3$ 2 | balance | attrition mill | 1700 | 93 | 6.2 | 2000 | 1.5 |
| 5 | TiC(W) 30 | $Y_2O_3$ 2 | balance | jet mill | 1700 | 91 | 6.2 | 2000 | 1.5 |
| 6 | TiC(W) 30 | $Y_2O_3$ 2 | balance | vibrating mill | 1700 | 80 | 6.5 | 2000 | 1.7 |
| 7 | TiC(W) 30 | $Y_2O_3$ 2 | balance | vibrating mill | 1750 | 70 | 6.0 | 1950 | 2.0 |
| *8 | TiC(W) 30 | $Y_2O_3$ 2 | balance | wet pulverization | 1850 | 15 | unmeasurable | 1350 | 6.0 |
| *9 | — | $Yb_2O_3$ 2 | balance | vibrating mill | 1600 | 60 | 3.5 | 1650 | 1.6 |
| 10 | TiC(W) 5 | $Yb_2O_3$ 2 | balance | vibrating mill | 1600 | 70 | 4.0 | 1750 | 1.5 |
| 11 | TiC(W) 10 | $Yb_2O_3$ 2 | balance | vibrating mill | 1650 | 80 | 5.0 | 1880 | 1.5 |
| 12 | TiC(W) 30 | $Yb_2O_3$ 2 | balance | vibrating mill | 1700 | 98 | 6.3 | 2050 | 1.5 |
| 13 | TiC(W) 50 | $Yb_2O_3$ 2 | balance | vibrating mill | 1750 | 80 | 6.5 | 2030 | 2.0 |
| 14 | TiC(W) 70 | $Yb_2O_3$ 2 | balance | vibrating mill | 1850 | 60 | 4.5 | 1800 | 3.0 |
| *15 | TiC(W) 80 | $Yb_2O_3$ 2 | balance | vibrating mill | 1900 | 10 | unmeasurable | unmeasurable | 5.0 |
| 16 | TiN(W) 30 | $Y_2O_3$ 2 | balance | vibrating mill | 1700 | 90 | 6.5 | 1950 | 1.5 |
| 17 | TiCN(W) 30 | $Y_2O_3$ 2 | balance | vibrating mill | 1700 | 90 | 6.5 | 1970 | 1.5 | note:
1) The asterisk(*) denotes test specimens falling outside of the scope of the present invention.

According to Table 1, it was necessary for Test Specimen No. 1, for which the wet mixing was adopted to mix alumina powder, to set the sintering temperature as high as 1850° C., and the particle size of alumina amounted to as large as 5 microns due to the grain growth of alumina in the sintered body. On account of the large alumina particle size, its bending strength was as low as 35 kg/mm$^2$.

On the contrary, the test specimens for the present invention which have undergone the dry milling step in accordance with the method described in the present invention permitted sintering at a low sintering temperature of 1600° to 1850° C. in either case. The sintered body thereby obtained has a micro structure having an average particle size of alumina of 3 microns or less and a bending strength of 60 kg/mm$^2$ or higher. Furthermore, there were achieved in the sintered body a fracture toughness of 4.0 MPam$^{\frac{1}{2}}$ or more and a Vickers hardness of 1750 kg/mm$^2$ or higher.

On the other hand, in the case of Test Specimen No. 9 fabricated without any whiskers incorporated, it is totally impossible to achieve an improved fracture toughness, although its bending strength is increased by carrying out the dry pulverization step. Moreover, when the amount of whiskers incorporated exceeded 70 volume %, the sinterability of Test Specimen No. 15

EXAMPLE 2

After weighing out $Al_2O_3$ powder having an average particle size of 1 micron or less and a purity of 99.9% or higher and either metal compound identified in Table 2 and Table 3, the powder was mixed and milled in an attrition mill for 12 hours. To this mixture was added Titanium-based whiskers having an average particle size of 0.8 micron, an oxygen content of 0.1 to 1.0 weight %, and an aspect ratio of 30–50 by each amount set forth in Table 2 and Table 3. The obtained powder was enclosed in a sealed nylon pot together with nylon balls and was mixed by the ball mill for 12 hours. The slurry obtained after the mixing step was dried and used for hot pressing.

The aforementioned material was placed in a carbon mold and was sintered by hot pressing at a specified temperature for 1 hour under a pressure in the range of 300 to 500 kg/mm$^2$ so that a test specimen for breaking strength test may be prepared in the same manner as in Example 1. (Test Specimen Nos. 18 to 51.) Rod-shape aluminum borate with an aspect ratio of 30–50 was, however, used as a boron-containing metal compound for Test Specimen No. 36.

Measurements were taken of the aforementioned specimens in the same manner as in Example. Test results are set forth in Table 4 and Table 5.

TABLE 2

| Test Specimen No. | Composition (Vol. %) | | Composition of Matrix (Wt. %) | | | Sintering Temperature (°C.) |
|---|---|---|---|---|---|---|
| | Component of matrix | Whiskers | Boron-containing Metal Compound | Auxiliary Sintering Agent | $Al_2O_3$ | |
| *18 | 98 | TiC 2 | $AlB_{12}$ 10 | $Y_2O_3$ 1 | balance | 1700 |
| 19 | 95 | TiC 5 | $AlB_{12}$ 10 | $Y_2O_3$ 1 | balance | 1700 |
| 20 | 80 | TiC 20 | $AlB_{12}$ 10 | $Y_2O_3$ 1 | balance | 1700 |
| 21 | 70 | TiC 30 | $AlB_{12}$ 10 | $Y_2O_3$ 1 | balance | 1750 |
| 22 | 60 | TiC 40 | $AlB_{12}$ 10 | $Y_2O_3$ 1 | balance | 1800 |
| 23 | 40 | TiC 60 | $AlB_{12}$ 10 | $Y_2O_3$ 1 | balance | 1900 |
| 24 | 70 | TiN 30 | $AlB_{12}$ 10 | $Y_2O_3$ 1 | balance | 1800 |
| 25 | 70 | TiCN 30 | $AlB_{12}$ 10 | $Y_2O_3$ 1 | balance | 1800 |
| 26 | 70 | TiC 30 | $AlB_{12}$ 0.02 | $Y_2O_3$ 1 | balance | 1800 |
| 27 | 70 | TiC 30 | $AlB_{12}$ 5 | $Y_2O_3$ 1 | balance | 1800 |
| 28 | 70 | TiC 30 | $AlB_{12}$ 20 | $Y_2O_3$ 1 | balance | 1800 |
| 29 | 70 | TiC 30 | $AlB_{12}$ 40 | $Y_2O_3$ 1 | balance | 1800 |
| *30 | 70 | TiC 30 | $AlB_{12}$ 50 | $Y_2O_3$ 1 | balance | 1800 |
| 31 | 70 | TiC 30 | $ZrB_2$ 15 | $Y_2O_3$ 1 | balance | 1800 |
| 32 | 70 | TiC 30 | $TiB_2$ 15 | $Y_2O_3$ 1 | balance | 1800 |
| 33 | 70 | TiC 30 | TaB 15 | $Y_2O_3$ 1 | balance | 1800 |
| 34 | 70 | TiC 30 | WB 15 | $Y_2O_3$ 1 | balance | 1800 |
| 35 | 70 | TiC 30 | $NbB_2$ 15 | $Y_2O_3$ 1 | balance | 1800 |

Note:
The asterisk(*) denotes test specimens falling outside of the scope of the present invention.

TABLE 3

| Test Specimen No. | Composition (Vol. %) | | Composition of Matrix (Wt. %) | | | Sintering Temperature (°C.) |
|---|---|---|---|---|---|---|
| | Component of matrix | Whiskers | Boron-containing Metal Compound | Auxiliary Sintering Agent | $Al_2O_3$ | |
| 36 | 70 | TiC 30 | $Al_{18}B_4O_{33}$ 15 | $Y_2O_3$ 1 | balance | 1700 |
| 37 | 70 | TiC 30 | $AlB_2$ 15 | $Y_2O_3$ 1 | balance | 1700 |
| 38 | 70 | TiC 30 | $NbB_2$ 15 | MgO 1 | balance | 1800 |
| 39 | 70 | TiC 30 | $NbB_2$ 15 | $SiO_2$ 1 | balance | 1800 |
| 40 | 70 | TiC 30 | $NbB_2$ 15 | $Yb_2O_3$ 1 | balance | 1800 |
| 41 | 70 | TiC 30 | $NbB_2$ 15 | $Er_2O_3$ 1 | balance | 1800 |
| 42 | 70 | TiC 30 | $NbB_2$ 15 | $Dy_2O_3$ 1 | balance | 1800 |
| 43 | 70 | TiC 30 | $NbB_2$ 15 | $Nd_2O_3$ 1 | balance | 1800 |
| 44 | 70 | TiC 30 | $NbB_2$ 15 | $Sm_2O_3$ 1 | balance | 1800 |
| 45 | 70 | TiC 30 | $AlB_{12}$ 10 | — | balance | 1750 |
| 46 | 70 | TiC 30 | $AlB_{12}$ 10 | $Y_2O_3$ 0.02 | balance | 1750 |
| 47 | 70 | TiC 30 | $AlB_{12}$ 10 | $Y_2O_3$ 0.5 | balance | 1750 |
| 48 | 70 | TiC 30 | $AlB_{12}$ 10 | $Y_2O_3$ 2.0 | balance | 1750 |
| 49 | 70 | TiC 30 | $AlB_{12}$ 10 | $Y_2O_3$ 4.0 | balance | 1750 |
| 50 | 70 | TiC 30 | $AlB_{12}$ 10 | $Y_2O_3$ 8.0 | balance | 1750 |
| 51 | 70 | TiC 30 | $AlB_{12}$ 10 | $Y_2O_3$ 13.0 | balance | 1750 |

TABLE 4

| Test Specimen No. | Vickers Hardness (Hv) | Fracture Toughness (MPa·m^½) | Breaking Strength (Kg/mm²) | Average Crystal Diameter of Alumina (μm) |
|---|---|---|---|---|
| *18 | 1700 | 4.5 | 65 | 4.0 |
| 19 | 1710 | 4.8 | 70 | 3.0 |
| 20 | 1980 | 5.5 | 80 | 2.0 |
| 21 | 2150 | 6.5 | 120 | 1.8 |
| 22 | 2150 | 7.0 | 100 | 1.5 |
| 23 | 1800 | 6.0 | 85 | 1.5 |
| 24 | 2100 | 6.5 | 110 | 1.8 |
| 25 | 2100 | 6.5 | 120 | 1.8 |
| 26 | 2030 | 6.2 | 118 | 2.0 |
| 27 | 2080 | 6.3 | 115 | 1.8 |
| 28 | 2200 | 7.0 | 110 | 1.8 |
| 29 | 2100 | 6.0 | 90 | 1.0 |
| *30 | 1850 | 5.0 | 80 | 1.0 |
| 31 | 2150 | 6.5 | 115 | 1.5 |
| 32 | 2150 | 6.5 | 100 | 1.5 |
| 33 | 2150 | 6.5 | 100 | 1.5 |
| 34 | 2200 | 6.5 | 118 | 1.5 |
| 35 | 2150 | 6.5 | 120 | 1.5 |

Note:
The asterisk(*) denotes test specimens falling outside of the scope of the present invention.

TABLE 5

| Test Specimen No. | Vickers Hardness (Hv) | Fracture Toughness (MPa·m^½) | Breaking Strength (Kg/mm²) | Average Crystal Diameter of Alumina (μm) |
|---|---|---|---|---|
| 36 | 2000 | 6.5 | 100 | 2.5 |
| 37 | 1950 | 6.5 | 100 | 1.8 |
| 38 | 2000 | 6.0 | 95 | 1.4 |
| 39 | 2000 | 6.0 | 95 | 1.4 |
| 40 | 2150 | 6.5 | 120 | 1.4 |
| 41 | 2100 | 6.5 | 115 | 1.4 |
| 42 | 2100 | 6.5 | 110 | 1.4 |
| 43 | 2200 | 6.5 | 115 | 1.4 |
| 44 | 2100 | 6.5 | 110 | 1.4 |
| 45 | 1650 | 4.5 | 50 | 1.5 |
| 46 | 2100 | 5.9 | 90 | 1.5 |
| 47 | 2170 | 6.5 | 120 | 1.5 |
| 48 | 2100 | 6.6 | 115 | 1.8 |
| 49 | 2000 | 6.5 | 115 | 1.8 |
| 50 | 1700 | 5.5 | 90 | 2.5 |
| 51 | 1650 | 4.5 | 60 | 3.5 |

EXAMPLE 3

After weighing out $Al_2O_3$ powder having an average particle size of 1 micron or less and a purity of 99.9% or higher, SiC powders with an average particle size of 0.5 micron, and, if so desired, oxides (auxiliary sintering aid) identified in Table 6, the powder was wet mixed and milled in ball mill for 12 hours. To this mixture was added TiC whiskers with an average diameter of 1.0 microns, an oxygen content of 0.1 to 1.0 weight % and an aspect ratio of 10-30 by the specified amount. The obtained powder was mixed by the rotary mill for 12 hours. The slurry obtained after the mixing step was dried and used for hot pressing.

Using the aforementioned material, test specimens for fracture test were fabricated in the same manner as in Example 1. (Test Specimen Nos. 52-81). Measurements were taken in the same manner as in Example 1.

The micro structure of each specimen was observed on the basis of microscopic photographs for the purpose of evaluation of the sinterability. Test results are set forth in Table 6. However, Test Specimen No. 81 was obtained as a sintered body in the same manner as the other specimens from a mixture of $Al_2O_3$ added with SiC whiskers.

TABLE 6

| Test Specimen No. | TiC (W) (Vol. %) | SiC (Vol. %) | SiC particle Size (μm) | Auxiliary Sintering Agent (wt. %) | $Al_2O_3$ | Sintering Temperature (°C.) | Breaking Strength (Kg/mm²) | Fracture Toughness ($K_{IC}$) (MPa · m$^{\frac{1}{2}}$) | Vickers Hardness (Kg/mm²) | Micro Structure | Average Crystal Diameter of Alumina (μm) |
|---|---|---|---|---|---|---|---|---|---|---|---|
| *52 | 30 | — | — | $Y_2O_3$ 1 | balance | 1700 | 75 | 4.5 | 1900 | good | 3.5 |
| 53 | 30 | 3 | 1.0 | $Y_2O_3$ 1 | balance | 1700 | 85 | 5.5 | 1950 | good | 3.0 |
| 54 | 30 | 5 | 1.0 | $Y_2O_3$ 1 | balance | 1700 | 90 | 6.0 | 2000 | good | 2.8 |
| 55 | 30 | 15 | 1.0 | $Y_2O_3$ 1 | balance | 1700 | 110 | 7.0 | 2050 | good | 1.5 |
| 56 | 30 | 25 | 1.0 | $Y_2O_3$ 1 | balance | 1750 | 95 | 7.0 | 2000 | good | 1.0 |
| *57 | 30 | 40 | 1.0 | $Y_2O_3$ 1 | balance | 1750 | 30 | — | 1600 | voids | 1.0 |
| 58 | 30 | 10 | 1.0 | — | balance | 1750 | 80 | 4.5 | 1950 | good | 1.5 |
| 59 | 30 | 10 | 1.0 | $Y_2O_3$ 0.1 | balance | 1750 | 80 | 5.0 | 1950 | good | 1.5 |
| 60 | 30 | 10 | 1.0 | $Y_2O_3$ 0.5 | balance | 1700 | 90 | 5.5 | 1980 | good | 1.5 |
| 61 | 30 | 10 | 1.0 | $Y_2O_3$ 1.0 | balance | 1700 | 100 | 7.0 | 2020 | good | 1.5 |
| 62 | 30 | 10 | 1.0 | $Y_2O_3$ 2.0 | balance | 1700 | 110 | 7.0 | 2000 | good | 1.6 |
| 63 | 30 | 10 | 1.0 | $Y_2O_3$ 3.0 | balance | 1700 | 100 | 6.5 | 1950 | good | 1.6 |
| 64 | 30 | 10 | 1.0 | $Y_2O_3$ 4.0 | balance | 1750 | 65 | 5.5 | 1800 | good | 1.6 |
| 65 | 30 | 10 | 1.0 | MgO 1.0 | balance | 1700 | 90 | 6.5 | 2050 | good | 1.4 |
| 66 | 30 | 10 | 1.0 | NiO 1.0 | balance | 1700 | 85 | 6.0 | 2000 | good | 1.5 |
| 67 | 30 | 10 | 1.0 | CoO 1.0 | balance | 1700 | 85 | 6.0 | 2000 | good | 1.5 |
| 68 | 30 | 10 | 1.0 | $Dy_2O_3$ 1.0 | balance | 1700 | 100 | 7.5 | 2020 | good | 1.5 |
| 69 | 30 | 10 | 1.0 | $Yb_2O_3$ 1.0 | balance | 1700 | 100 | 7.0 | 2050 | good | 1.5 |
| 70 | 30 | 10 | 1.0 | $Nd_2O_3$ 1.0 | balance | 1700 | 100 | 6.5 | 1980 | good | 1.5 |
| 71 | 30 | 10 | 1.0 | $Er_2O_3$ 1.0 | balance | 1700 | 100 | 7.0 | 1950 | good | 1.5 |
| 72 | 30 | 10 | 2.0 | $Y_2O_3$ 1.0 | balance | 1700 | 70 | 6.5 | 1870 | good | 1.7 |
| 73 | 30 | 10 | 0.5 | $Y_2O_3$ 1.0 | balance | 1700 | 110 | 7.8 | 2050 | good | 1.3 |
| 74 | 30 | 10 | 0.3 | $Y_2O_3$ 1.0 | balance | 1750 | 120 | 8.0 | 2050 | good | 1.0 |
| 75 | 30 | 10 | >0.2 | $Y_2O_3$ 1.0 | balance | 1750 | 130 | 6.0 | 2100 | good | 1.0 |
| 76 | — | 10 | 1.0 | $Y_2O_3$ 1.0 | balance | 1700 | 90 | 4.0 | 1800 | good | 3.5 |
| 77 | 5 | 10 | 1.0 | $Y_2O_3$ 1.0 | balance | 1700 | 95 | 4.5 | 1900 | good | 3.0 |
| *78 | 20 | 10 | 1.0 | $Y_2O_3$ 1.0 | balance | 1700 | 100 | 6.5 | 1980 | good | 1.8 |
| 79 | 20 | 10 | 1.0 | $Y_2O_3$ 1.0 | balance | 1800 | 80 | 7.5 | 2000 | good | 1.6 |
| 80 | 60 | 10 | 1.0 | $Y_2O_3$ 1.0 | balance | 1850 | 50 | 5.0 | 1700 | good | 1.6 |
| *81 | SiC (W) 30 | — | — | $Y_2O_3$ 1.0 | balance | 1700 | 80 | 6.5 | 2000 | good | 2.0 |

EXAMPLE 4

The material for hot pressing was prepared according to the composition set forth in Table 7 in the same manner as in Example 3, and test specimens for fracture test were fabricated similarly (Test Specimen No. 82 to 107).

Those test specimens were tested in the same manner as in Example 3. Test results are set forth in Table 7. Test Specimens No. 102 to 107, however, were prepared with TiC whiskers coated with carbon equivalent in quantity to 1 weight % of the substrate whiskers instead of the carbon powder which was used elsewhere.

TABLE 7

| Test Specimen No. | TiC (W) (Vol. %) | Auxiliary Sintering Agent (wt. %) | carbon Powder (wt. %) | $Al_2O_3$ | Sintering Temperature (°C.) | Breaking Strength (Kg/mm²) | Fracture Toughness ($K_{IC}$) (MPa · m$^{\frac{1}{2}}$) | Vickers Hardness (Kg/mm²) | Micro Structure | Average Crystal Diameter of Alumina (μm) |
|---|---|---|---|---|---|---|---|---|---|---|
| 82 | 34 | $Y_2O_3$ 1 | 0 | balance | 1750 | 80 | 4.5 | 1900 | good | 1.8 |
| 83 | 34 | $Y_2O_3$ 1 | 0.05 | balance | 1750 | 85 | 5.0 | 1980 | good | 1.5 |
| 84 | 34 | $Y_2O_3$ 1 | 0.1 | balance | 1750 | 90 | 5.5 | 2000 | good | 1.3 |
| 85 | 34 | $Y_2O_3$ 1 | 1.0 | balance | 1750 | 105 | 7.0 | 2050 | good | 1.3 |
| 86 | 34 | $Y_2O_3$ 1 | 2.0 | balance | 1750 | 90 | 6.0 | 1990 | good | 1.3 |
| *87 | 34 | $Y_2O_3$ 1 | 3.0 | balance | 1750 | 45 | — | 1750 | voids | 1.3 |
| 88 | 34 | — | 1.0 | balance | 1850 | 70 | 6.0 | 1850 | good | 1.3 |
| 89 | 34 | $Y_2O_3$ 0.1 | 1.0 | balance | 1750 | 70 | 5.5 | 1900 | good | 1.3 |
| 90 | 34 | $Y_2O_3$ 0.5 | 1.0 | balance | 1750 | 95 | 8.0 | 2030 | good | 1.3 |
| 91 | 34 | $Y_2O_3$ 2.0 | 1.0 | balance | 1750 | 115 | 6.5 | 2060 | good | 1.5 |
| 92 | 34 | $Y_2O_3$ 3.0 | 1.0 | balance | 1750 | 100 | 6.0 | 2000 | good | 1.5 |
| 93 | 34 | $Y_2O_3$ 4.0 | 1.0 | balance | 1750 | 60 | 4.5 | 1800 | good | 1.9 |
| 94 | 34 | MgO 1.0 | 1.0 | balance | 1750 | 85 | 5.5 | 1900 | good | 1.5 |

TABLE 7-continued

| Test Specimen No. | Composition 2) | | | | Sintering Temperature (°C.) | Properties of Sintered Body | | | | Average Crystal Diameter of Alumina (μm) |
| | TiC (W) (Vol. %) | Auxiliary Sintering Agent (wt. %) | carbon Powder (wt. %) | Al₂O₃ | | Breaking Strength (Kg/mm²) | Fracture Toughness (K$_{IC}$) (MPa·m$^{\frac{1}{2}}$) | Vickers Hardness (Kg/mm²) | Micro Structure | |
|---|---|---|---|---|---|---|---|---|---|---|
| 95 | 34 | NiO 1.0 | 1.0 | balance | 1750 | 90 | 6.0 | 2000 | good | 1.7 |
| 96 | 34 | CoO 1.0 | 1.0 | balance | 1750 | 95 | 6.0 | 2000 | good | 1.7 |
| 97 | 34 | Dy₂O₃ 1.0 | 1.0 | balance | 1750 | 107 | 7.5 | 2050 | good | 1.6 |
| 98 | 34 | Yb₂O₃ 1.0 | 1.0 | balance | 1750 | 110 | 7.0 | 2080 | good | 1.6 |
| 99 | 34 | Nd₂O₃ 1.0 | 1.0 | balance | 1750 | 102 | 6.5 | 2030 | good | 1.6 |
| 100 | 34 | Er₂O₃ 1.0 | 1.0 | balance | 1750 | 100 | 6.8 | 1950 | good | 1.6 |
| *101 | 0 | Y₂O₃ 1.0 | — | balance | 1750 | 50 | 4.0 | 1550 | good | 4.0 |
| 102 | 10 | Y₂O₃ 1.0 | (1.0) | balance | 1700 | 90 | 5.0 | 1800 | good | 2.5 |
| 103 | 20 | Y₂O₃ 1.0 | (1.0) | balance | 1750 | 108 | 7.0 | 2000 | good | 2.0 |
| 104 | 34 | Y₂O₃ 1.0 | (1.0) | balance | 1750 | 90 | 7.5 | 1200 | good | 1.8 |
| 105 | 50 | Y₂O₃ 1.0 | (1.0) | balance | 1850 | 70 | 8.3 | 2030 | good | 1.4 |
| 106 | 60 | Y₂O₃ 1.0 | (1.0) | balance | 1850 | 60 | 8.5 | 1800 | good | 1.4 |
| 107 | 70 | Y₂O₃ 1.0 | (1.0) | balance | 2000 | 20 | — | 1600 | good | 1.5 | note:
2) The value in parentheses represents the amount of carbon coated on TiC whiskers.

We claim:

1. A whiskers-reinforced ceramic material, comprising:
   a matrix comprising principally alumina having an average particle size of about 3 microns or less;
   at least one kind of whiskers selected from the group consisting of titanium carbide, titanium nitride and titanium carbo-nitride, wherein the whiskers are 5 to 70 volume percent of the material; and
   a metal boride which is 0.02 to 40 weight percent of the matrix.

2. The whiskers-reinforced ceramic material of claim 1, wherein the material when sintered has a bending strength of about 60 kg/mm² or higher.

3. The whiskers-reinforced ceramic material of claim 1, wherein the metal boride includes at least one element selected from the group consisting of metals in the periodic table Groups IVB, VB, VIB, aluminum and oxygen.

4. The whiskers-reinforced ceramic material of claim 1, wherein the metal boride includes at least one compound selected from the group consisting of AlB$_{12}$, ZrB$_2$, TiB$_2$, TaB, WB, NbB$_2$, LaB$_6$ and Al$_{18}$B$_4$O$_{33}$.

5. The whiskers-reinforced ceramic material of claim 4, wherein the metal boride includes rod-shaped crystals having an aspect ratio of 1.5 or more.

6. The Whiskers-reinforced ceramic material of claim 1, wherein the material includes 0.02 to 8 weight percent of a sintering aid selected from the group consisting of an oxide of at least one element selected from Mg, Ca, Si, an element of Group IIIB of the periodic table and lanthanides.

7. The whiskers-reinforced ceramic material of claim 6, wherein the elements are selected from an element of Group IIIB of the periodic table and lanthanides consisting of Yb, Nd, Er, Ce, Sm, Y, Gd, Dy and La.

8. The whiskers-reinforced ceramic material of claim 1, wherein the material includes 3 to 30 volume percent of silicon carbide particles.

9. The whiskers-reinforced ceramic material of claim 1, wherein the material includes 0.05 to 2 weight percent of carbon.

10. The whiskers-reinforced ceramic material of claim 1, wherein the whiskers have an oxygen content of 3 weight percent or less.

11. In a process of preparing a sintered whisker-reinforced ceramic material, by forming a starting material, molding the starting material into a shape and sintering the molded starting material, the improvement wherein the step of forming a starting material comprises
   activating alumina with an average particle size of about 3 microns or less;
   mixing the alumina with 5 to 70 volume percent of whiskers selected from the group consisting of titanium carbide, titanium nitride and titanium carbo-nitride; and
   mixing the alumina with a metal boride which is 0.02 to 40 weight percent of the matrix.

12. The process of preparing the sintered whiskers-reinforced ceramic material of claim 1, further comprising the step of molding the starting material by a method selected from the group consisting of compression molding, extrusion, injection molding and hydrostatic cold molding.

13. The process of preparing the sintered whiskers-reinforced ceramic material of claim 12, further comprising the step of sintering the molded material by a method selected from the group consisting of conventional sintering, hot pressing, and hot isostatic pressing at a temperature between 1650° and 1850° C. and in an inert or reducing atmosphere.

14. The process of preparing the sintered whiskers-reinforced ceramic material of claim 11, wherein the activating step is selected from the group consisting of adding a carbon powder, adding a metal boride, limiting the oxygen content of the whiskers to 3 volume percent or less and pulverizing the alumina.

15. The process of preparing the sintered whiskers-reinforced ceramic material of claim 11, wherein the metal boride includes an element selected from the group consisting of metals in the periodic table Groups IVB, VB, VIB, aluminum and oxygen.

16. The process of preparing the sintered whiskers-reinforced ceramic material of claim 11, wherein the metal boride includes a compound selected from the group consisting of AlB$_{12}$, ZrB$_2$, TiB$_2$, TaB, WB, NbB$_2$, LaB$_6$ and Al$_{18}$B$_4$O$_{33}$.

17. The process of preparing the sintered whiskers-reinforced ceramic material of claim 11, wherein the material includes 0.02 to 8 weight percent of sintering aid selected from the group consisting of an oxide of an element selected from Mg, Ca, Si and the periodic table Group IIIB and lanthanides.

18. A whiskers-reinforced ceramic material, comprising:
- a matrix comprising principally alumina having an average particle size of about 3 microns or less; and
- at least one kind of whiskers selected from the group consisting of titanium carbide, titanium nitride and titanium carbo-nitride, wherein the whiskers are between in excess of 50 volume percent and 70 volume percent of the material.

19. A whiskers-reinforced ceramic material, comprising:
- a matrix comprising principally alumina having an average particle size of about 3 microns or less;
- at least one kind of whiskers selected from the group consisting of titanium carbide, titanium nitride and titanium carbo-nitride, wherein the whiskers are 5 to 70 volume percent of the material; and
- carbon which is 0.05 to 2 weight percent of the material.

20. A whiskers-reinforced ceramic material, comprising:
- a matrix comprising principally of alumina having an average particle size of about 3 microns or less;
- at least one kind of whiskers selected from the group consisting of titanium carbide, titanium nitride and titanium carbo-nitride, wherein the whiskers are from 5 to 70 volume percent of the material; and
- 0.02 to 8 weight percent of a sintering aid selected from the group consisting of an oxide of an element selected from Ni, Co, St, Si, an element of the periodic table Group IIIB and lanthanides.

21. A whiskers-reinforced ceramic material, comprising:
- a matrix comprising principally alumina having an average particle size of about 3 microns or less;
- at least one kind of whiskers selected from the group consisting of titanium carbide, titanium nitride and titanium carbo-nitride, wherein the whiskers are 5 to 70 volume percent of the material; and
- the whiskers having an oxygen content of from 0.05 to 3 weight percent.

22. A whiskers-reinforced ceramic material, comprising:
- a matrix comprising principally of alumina having an average particle size of about 3 microns or less;
- at least one kind of whiskers selected from the group consisting of titanium carbide, titanium nitride and titanium carbo-nitride, wherein the whiskers are from 5 to 70 volume percent of the material; and
- granular silicon carbide which is 3 to 30 volume percent of the material.

23. The whiskers-reinforced ceramic material of claim 1, wherein the metal boride is 0.5 to 10 weight percent of the matrix.

24. The whiskers-reinforced ceramic material of claim 1, wherein the whiskers have an average aspect ratio of 3–100.

25. The whiskers-reinforced ceramic material of claim 1, wherein the whiskers have an average aspect ratio of 10–30.

26. The whiskers-reinforced ceramic material of claim 8, wherein the silicon carbide particles have an average particle size of one micron or less.

27. The whiskers-reinforced ceramic material of claim 8, wherein the silicon carbide particles have an average particle size of 0.5 micron or less.

28. The whiskers-reinforced ceramic material of claim 8, wherein the material includes 5 to 15 volume percent of silicon carbide.

29. The whiskers-reinforced ceramic material of claim 9, wherein the carbon particles have an average particle size of 0.5 micron or less.

30. The whiskers-reinforced ceramic material of claim 9, wherein the carbon particles have an average particle size of one micron or less.

* * * * *